(12) United States Patent
Candry et al.

(10) Patent No.: US 9,772,549 B2
(45) Date of Patent: Sep. 26, 2017

(54) DISPLAY SYSTEMS AND METHODS EMPLOYING POLARIZING REFLECTIVE SCREENS

(71) Applicant: Barco, Inc., Rancho Cordova, CA (US)

(72) Inventors: Patrick Candry, Kuurne (BE); Bart Maximus, Kuurne (BE); Geert Matthys, Kuurne (BE); Claude Tydtgat, Kuurne (BE)

(73) Assignee: Barco, Inc., Rancho Cordova, CA (US)

( * ) Notice: Subject to any disclaimer, the term of this patent is extended or adjusted under 35 U.S.C. 154(b) by 111 days.

(21) Appl. No.: 14/804,729

(22) Filed: Jul. 21, 2015

(65) Prior Publication Data

US 2016/0088272 A1 Mar. 24, 2016

Related U.S. Application Data

(60) Provisional application No. 62/027,687, filed on Jul. 22, 2014.

(51) Int. Cl.
*G03B 21/56* (2006.01)
*H04N 9/31* (2006.01)
(Continued)

(52) U.S. Cl.
CPC .............. *G03B 21/567* (2013.01); *G02B 1/11* (2013.01); *G02B 5/0284* (2013.01);
(Continued)

(58) Field of Classification Search
CPC ...... G02B 1/11; G02B 5/0284; G02B 5/0294; G02B 5/3016; G02B 5/3041;
(Continued)

(56) References Cited

U.S. PATENT DOCUMENTS 4,679,069 A 7/1987 Andrea et al.
5,137,450 A 8/1992 Thomas
(Continued)

FOREIGN PATENT DOCUMENTS

CN 101303456 11/2008
CN 101888565 11/2010
(Continued)

OTHER PUBLICATIONS

PCT Search Report and Written opinion for PCT/US15/41372 mailed Jan. 13, 2016 in 15 pages.
(Continued)

*Primary Examiner* — Sultan Chowdhury
*Assistant Examiner* — Magda Cruz
(74) *Attorney, Agent, or Firm* — Knobbe, Martens, Olson & Bear, LLP

(57) ABSTRACT

An immersive display system is disclosed that includes screens configured to mitigate reduction in contrast ratio due at least in part to peripheral light incident on the screens. The immersive display system includes at least two screens and at least two projector systems. The screens have a multi-layered structure configured to selectively reflect light in a tailored polarization state. Adjacent screens can be configured to selectively reflect light in orthogonal polarization states. The projector systems can be configured to project video onto their respective screens with light in a suitable polarization state. The screens can be further configured to selectively reflect light within a plurality of tailored spectral bands, the spectral bands being different for respective screens.

20 Claims, 10 Drawing Sheets

(51) Int. Cl.
*G02B 1/11* (2015.01)
*G02B 5/02* (2006.01)
*G02B 5/30* (2006.01)
*G03B 21/604* (2014.01)
*G03B 37/04* (2006.01)
*G06F 3/14* (2006.01)
*G09G 3/00* (2006.01)

(52) U.S. Cl.
CPC ......... *G02B 5/0294* (2013.01); *G02B 5/3016* (2013.01); *G02B 5/3041* (2013.01); *G02B 5/3083* (2013.01); *G03B 21/565* (2013.01); *G03B 21/604* (2013.01); *G03B 37/04* (2013.01); *H04N 9/3147* (2013.01); *G06F 3/1446* (2013.01); *G09G 3/002* (2013.01); *G09G 3/003* (2013.01); *G09G 2300/026* (2013.01)

(58) Field of Classification Search
CPC .. G02B 5/3083; G03B 21/565; G03B 21/567; G03B 21/604; G03B 37/04; H04N 9/3147; G06F 3/1446; G09G 2300/026; G09G 3/002; G09G 3/003
See application file for complete search history.

(56) References Cited

U.S. PATENT DOCUMENTS

| | | | |
|---|---|---|---|
| 5,148,309 A * | 9/1992 | Yamada | G03B 21/604 359/443 |
| 5,193,015 A | 3/1993 | Shanks | |
| 5,528,425 A | 6/1996 | Beaver | |
| 5,625,489 A | 4/1997 | Glenn | |
| 5,715,083 A | 2/1998 | Takayama | |
| 5,964,064 A | 10/1999 | Goddard et al. | |
| 6,011,580 A | 1/2000 | Hattori et al. | |
| 6,144,491 A | 11/2000 | Orikasa et al. | |
| 6,184,934 B1 | 2/2001 | Nishiki | |
| 6,381,068 B1 | 4/2002 | Harada et al. | |
| 6,924,833 B1 | 8/2005 | McDowall et al. | |
| 6,988,803 B2 | 1/2006 | Maximus | |
| 7,035,006 B2 | 4/2006 | Umeya et al. | |
| 7,347,556 B2 | 3/2008 | Kasik et al. | |
| 7,414,831 B1 | 8/2008 | Brown et al. | |
| 7,471,352 B2 | 12/2008 | Woodgate et al. | |
| 7,679,828 B2 | 3/2010 | Munro | |
| 7,931,377 B2 | 4/2011 | Shinozaki et al. | |
| 8,149,508 B2 | 4/2012 | Ferren et al. | |
| 8,179,424 B2 | 5/2012 | Moller | |
| 8,277,055 B2 | 10/2012 | Kuhlman et al. | |
| 8,388,138 B1 | 3/2013 | Boothroyd | |
| 8,567,953 B2 | 10/2013 | O'Dor et al. | |
| 8,692,861 B2 | 4/2014 | Liu et al. | |
| 8,714,746 B2 | 5/2014 | Choi et al. | |
| 8,780,039 B2 | 7/2014 | Gay et al. | |
| 8,786,683 B2 | 7/2014 | Akita | |
| 2001/0030804 A1 | 10/2001 | Lambert et al. | |
| 2003/0117704 A1 | 6/2003 | Lippey et al. | |
| 2005/0068620 A1* | 3/2005 | Umeya | G03B 21/604 359/459 |
| 2005/0231800 A1 | 10/2005 | Lippey | |
| 2005/0264882 A1 | 12/2005 | Daiku | |
| 2006/0056021 A1 | 3/2006 | Yeo et al. | |
| 2006/0114171 A1 | 6/2006 | Vascotto et al. | |
| 2006/0257586 A1 | 11/2006 | Umeya | |
| 2006/0268013 A1 | 11/2006 | Miles | |
| 2007/0014318 A1 | 1/2007 | Hajjar et al. | |
| 2007/0127121 A1 | 6/2007 | Maximus et al. | |
| 2007/0133089 A1 | 6/2007 | Lipton et al. | |
| 2008/0080047 A1 | 4/2008 | Field et al. | |
| 2009/0246404 A1 | 10/2009 | Greer et al. | |
| 2010/0002154 A1 | 1/2010 | Hua | |
| 2011/0096136 A1 | 4/2011 | Liu et al. | |
| 2011/0157694 A1 | 6/2011 | Ferren et al. | |
| 2012/0026157 A1 | 2/2012 | Unkel et al. | |
| 2012/0320049 A1 | 12/2012 | Kim et al. | |
| 2013/0181901 A1 | 7/2013 | West et al. | |
| 2013/0222557 A1 | 8/2013 | Kuo et al. | |
| 2013/0286154 A1 | 10/2013 | Wittke et al. | |
| 2013/0300637 A1 | 11/2013 | Smits et al. | |
| 2013/0308183 A1 | 11/2013 | Vermeirsch et al. | |
| 2014/0016041 A1 | 1/2014 | Kim et al. | |
| 2014/0016099 A1* | 1/2014 | Choi | E04H 3/22 353/30 |
| 2014/0375914 A1 | 12/2014 | Murao et al. | |
| 2016/0088270 A1 | 3/2016 | Candry et al. | |
| 2016/0088271 A1 | 3/2016 | Candry et al. | |
| 2016/0116834 A1 | 4/2016 | Candry et al. | |
| 2016/0202478 A1 | 7/2016 | Masson et al. | |

FOREIGN PATENT DOCUMENTS

| | | |
|---|---|---|
| CN | 2002939369 | 5/2013 |
| JP | 2000-338449 | 12/2000 |
| JP | 2002-365730 | 12/2002 |
| JP | 2008-175960 | 7/2008 |
| JP | 2009-198699 | 9/2009 |
| JP | 2011-128633 | 6/2011 |
| KR | 100596240 B1 | 7/2006 |
| WO | WO 91/15930 | 10/1991 |
| WO | WO 2004/010681 | 1/2004 |
| WO | WO 2008/091339 | 7/2008 |
| WO | WO 2009/040698 | 4/2009 |
| WO | WO 2011/062822 | 5/2011 |
| WO | WO 2012/040797 | 4/2012 |
| WO | WO 2012/064621 | 5/2012 |
| WO | WO 2013/063235 | 5/2013 |
| WO | WO 2013/095967 | 6/2013 |
| WO | WO 2013/182018 | 12/2013 |
| WO | WO 2015/036501 | 3/2015 |
| WO | WO 2016/014479 | 1/2016 |
| WO | WO 2016/014506 | 1/2016 |
| WO | WO 2016/014560 | 1/2016 |
| WO | WO 2016/069631 | 5/2016 |

OTHER PUBLICATIONS

Bolas et al.: "Environmental and Immersive Display Research at the University of Southern California," IEEE VR 2006 Workshop on Emerging Display Technologies, in 4 pages.
Eyevis GmbH, Immersive Cube System brochure, Feb. 2009, in 2 pages.
Eon Icube, website printout, available at http://www.eonreality.com/eon-icube/; retrieved Dec. 7, 2015 in 7 pages.
Gross et al.: "blue-c: A Spatially Immersive Display and 3D Video Portal for Telepresence," ACM Transactions on Graphics (TOG)—Proceedings of ACM SIGGRAPH 2003, TOG, vol. 22, Issue 3, Jul. 2003, ACM New York, NY, USA, pp. 819-827.
PCT International Preliminary Report on Patentability for PCT/US15/41372 mailed Feb. 2, 2017 in 7 pages.

* cited by examiner

DISPLAY SYSTEMS AND METHODS EMPLOYING POLARIZING REFLECTIVE SCREENS

CROSS-REFERENCE TO RELATED APPLICATIONS

This application claims the benefit of priority to U.S. Prov. App'n No. 62/027,687, filed Jul. 22, 2014, entitled "Display Systems and Methods Employing Polarizing Reflective Screens," which is incorporated by reference herein in its entirety.

BACKGROUND

Field

The present disclosure generally relates to display systems and methods having one or more displays arranged for immersive viewing of an image and includes systems and methods to enhance at least the dynamic range and the contrast ratio of the image based at least in part on the use of polarizing reflective screens.

Description of Related Art

Digital cinema servers and projectors receive digital content for projection in a theater or other venue. The content can be packaged in one or more digital files for delivery and storage on a media server. The media server can then extract the digital content from the one or more digital files for display using one or more projectors. In some cases, the content can be 3D video projected onto a screen where slightly different visual content is projected for simultaneous observation in the right and left eyes of a viewer to create the illusion of depth. A multi-projection system can be used to display video on a plurality of screens in a venue, such as in a theater or auditorium, to facilitate an immersive experience for the viewer.

SUMMARY

Example embodiments described herein have innovative features, no single one of which is indispensable or solely responsible for their desirable attributes. Without limiting the scope of the claims, some of the advantageous features will now be summarized.

An immersive display system can include a plurality of projection systems arranged to provide immersive viewing of video. Such an immersive display system can include a plurality of projector systems that each projects video configured to complement one another to provide an immersive viewing experience for viewers. Each projector system can be configured to project its video onto a projection surface placed around an audience. In this way, the audience can experience a sense of immersion into the environment depicted in the video. Video provided by the plurality of projector systems may be projected on the plurality of projection surfaces creating a unified video presentation. Such immersive display systems are capable of generating audiovisual presentations with a relatively high level of realism due at least in part to the quality of the images provided on the plurality of projection surfaces.

However, having multiple projection surfaces can result in light being reflected from a first projection surface to a second projection surface and then to the viewer. This light mixes with the light reflected directly from the first projection surface to the viewer. Such mixing of light on the plurality of projection surfaces can reduce the contrast ratio and/or dynamic range of the projection surfaces, thereby diminishing the quality of the images provided in the immersive display system. This mixing of light can be referred to as cross-talk or cross-reflection and can be a challenge in immersive display systems. This challenge may be even more difficult to overcome for immersive display systems designed for a relatively large group of people, such as in a movie theater, due at least in part to the wide range of viewing angles of the viewers in the audience.

Accordingly, systems and methods are provided herein for immersive display systems that include a plurality of projection surfaces (e.g., screens) that are usable over a wide range of viewing angles and for which a decrease in the contrast ratio and/or dynamic range caused by cross-talk or cross-reflection between different parts of the plurality of projection surfaces is substantially reduced. In some embodiments, the systems and methods disclosed herein provide relatively high-contrast, high-dynamic range immersive viewing of images using two or more curved or plane screens where the polarization state of the imaging light of the projectors is matched with the reflection properties of the polarizing reflective screens and the polarization states of the imaging light on adjacent screens are mutually orthogonal. Degradation of the contrast ratio or dynamic range for a screen due to light from a non-adjacent screen can be mitigated based at least in part on the position and/or orientation of the screen relative to the non-adjacent screen and/or by wavelength selective reflection of the light on the screen, the reflected wavelengths different from wavelengths reflected by the non-adjacent screen.

In a first aspect, an immersive display system is provided that includes a first screen comprising a multilayer structure configured to selectively reflect light in a first polarization state. The system also includes a second screen comprising a multilayer structure configured to selectively reflect light in a second polarization state orthogonal to the first polarization state. The system also includes a first projector system configured to project a first video onto the first screen with light in the first polarization state. The system also includes a second projector system configured to project a second video onto the second screen with light in the second polarization state. The first screen is positioned adjacent to the second screen so that the first video and the second video are configured to be simultaneously viewed by a plurality of viewers in an immersive viewing environment.

In some embodiments of the first aspect, the first screen is further configured to selectively reflect light in at least three, non-overlapping wavelength bands. In a further embodiment, the second screen is further configured to selectively reflect light in at least three, non-overlapping wavelength bands, each of the three, non-overlapping wavelength bands also being non-overlapping with the at least three non-overlapping wavelength bands of the first screen.

In some embodiments of the first aspect, the system includes a sound system positioned behind the first screen. In a further embodiment, the first screen further comprises a plurality of holes configured to allow sound from the sound system to reach the immersive viewing environment.

In some embodiments of the first aspect, the first and screens are curved.

In a second aspect, a polarizing reflective screen for an immersive display system is provided. The screen includes a first layer comprising an anti-reflection element or a glare suppression element configured to suppress specular reflections of light incident on the screen. The screen also includes a second layer comprising transmitting polarizing element configured to transmit light in a first polarization state and absorb light in a second polarization state orthogonal to the first polarization state. The screen also includes a third layer comprising polarizing-preserving, light-diffusing element configured to scatter light in a plurality of directions. The screen also includes a fourth layer comprising reflective polarizing element configured to reflect light in the second polarization state and to transmit light in the first polarization state. The screen also includes a fifth layer comprising a light-absorbing element for visible light configured to absorb light in the first and second polarization states. The screen also includes a sixth layer comprising a substrate.

In some embodiments of the second aspect, the screen includes an adhesive layer. In some embodiments of the second aspect, the first layer is adjacent to the second layer, the second layer is adjacent to the third layer, the third layer is adjacent to the fourth layer, the fourth layer is adjacent to the fifth layer, and the fifth layer is adjacent to the sixth layer. In some embodiments of the second aspect, the first polarization state is right-handed circular polarization. In some embodiments of the second aspect, the first polarization state is linear polarization. In some embodiments of the second aspect, the first polarization state is right-handed circular polarization.

An immersive display system is also provided that includes the screen of the second aspect and a second and a third screen positioned on either side of the screen of the second aspect. The second and third screens each include a first layer comprising an anti-reflection element or a glare suppression element configured to suppress specular reflections of light incident on the screen; a second layer comprising transmitting polarizing element configured to transmit light in the second polarization state and absorb light in the first polarization state orthogonal to the first polarization state; a third layer comprising polarizing-preserving, light-diffusing element configured to scatter light in a plurality of directions; a fourth layer comprising reflective polarizing element configured to reflect light in the first polarization state and to transmit light in the second polarization state; a fifth layer comprising a light-absorbing element for visible light configured to absorb light in the first and second polarization states; and a sixth layer comprising a substrate.

In a third aspect, a polarizing reflective screen for an immersive display system is provided. The screen includes a first layer comprising an anti-reflection or glare-suppression element configured to suppress specular reflections of light incident upon the screen. The screen also includes a second layer comprising a cholesteric diffuse-reflecting polarizer for left-handed circular polarized light in a first wavelength range. The screen also includes a third layer comprising a cholesteric diffuse-reflecting polarizer for left-handed circular polarized light in a second wavelength range different from the first wavelength range. The screen also includes a fourth layer comprising a cholesteric diffuse-reflecting polarizer for left-handed circular polarized light in a third wavelength range different from the first and second wavelength ranges. The screen also includes a fifth layer comprising a light absorbing element. The screen also includes a sixth layer comprising a substrate.

In some embodiments of the third aspect, the screen includes an adhesive layer. In some embodiments of the third aspect, the first layer is adjacent to the second layer, the second layer is adjacent to the third layer, the third layer is adjacent to the fourth layer, the fourth layer is adjacent to the fifth layer, and the fifth layer is adjacent to the sixth layer. In some embodiments of the third aspect, the first wavelength range includes the wavelength 635 nm, the second wavelength range includes the wavelength 537 nm, and the third wavelength range includes the wavelength 450 nm. In some embodiments of the third aspect, the first wavelength range includes the wavelength 655 nm, the second wavelength range includes the wavelength 557 nm, and the third wavelength range includes the wavelength 470 nm. In some embodiments of the third aspect, each of the first, second, and third wavelength ranges cover about 15 nm.

An immersive display system is also provded that includes the screen of the third aspect and a second screen positioned adjacent to the screen third aspect. The second screen includes a first layer comprising an anti-reflection or glare-suppression element configured to suppress specular reflections of light incident upon the screen; a second layer comprising a cholesteric diffuse-reflecting polarizer for right-handed circular polarized light in a fourth wavelength range different from the first, second, and third wavelength ranges; a third layer comprising a cholesteric diffuse-reflecting polarizer for right-handed circular polarized light in a fifth wavelength range different from the first, second, third, and fourth wavelength ranges; a fourth layer comprising a cholesteric diffuse-reflecting polarizer for right-handed circular polarized light in a third wavelength range different from the first, second, third, fourth, and fifth wavelength ranges; a fifth layer comprising a light absorbing element; and a sixth layer comprising a substrate.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Figure 1A:
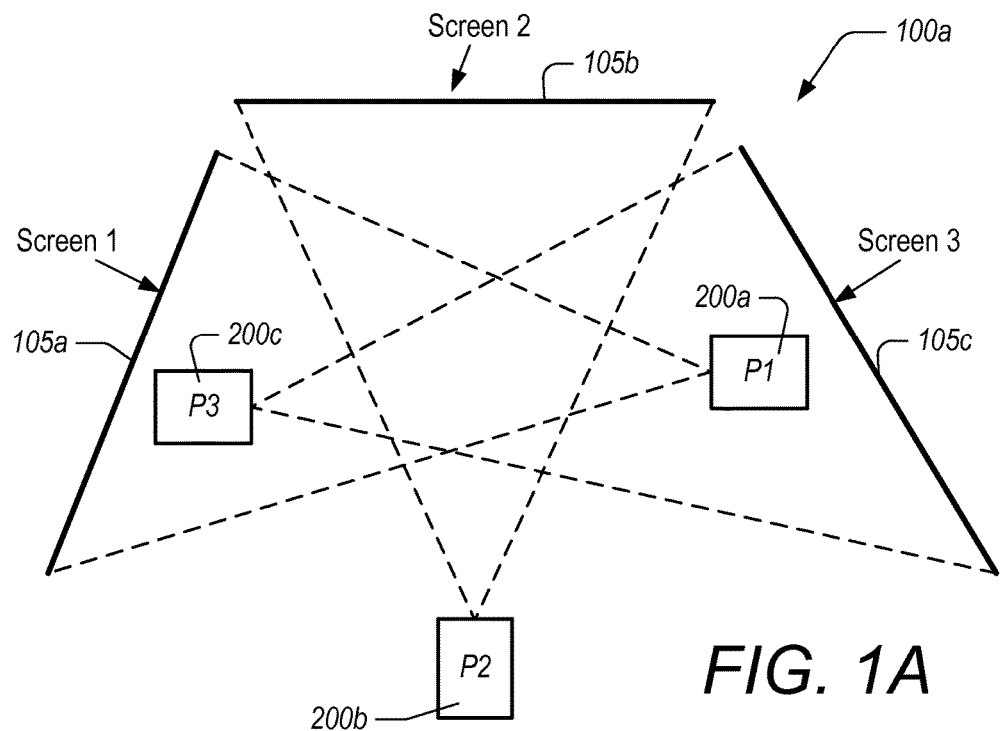
FIGS. 1A and 1B illustrate example immersive display systems for providing an immersive display experience.

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Immersive display systems are capable of generating images with a high level of realism because the images are simultaneously presented to the viewer in many directions. Typical immersive display systems may suffer from a low contrast ratio and a low dynamic range due at least in part to cross-talk or cross-reflection. As used herein, cross-talk and/or cross-reflection refers generally to the situation where light emitted from one part of a screen of an immersive display system is incident on other parts of the screen of the immersive display system and these emitted rays are then partially reflected back to one or more viewers after diffuse reflection. This cross-talk or cross-reflection may arise in typical immersive display systems due at least in part to the screens reflecting substantially all of the light incident thereon. Generally, peripheral light, e.g., light that is not related with the local image projected on the screen or provided by the display, that is incident on a display-screen and that is not absorbed by the display-screen is superimposed on the displayed image resulting in reduced image contrast. Peripheral light or illumination can strongly deteriorate the contrast ratio of the image. Similarly, peripheral light can deteriorate the color saturation of the image and, consequently, the dynamic range of the image. Therefore, it is desirable and advantageous to reduce or minimize reflection of peripheral light in general, and in particular to reduce or minimize cross-talk.

Accordingly, disclosed herein are systems and methods to improve the rejection of peripheral light on front projection screens to thereby enhance the contrast of images generated by front projection. In particular, disclosed herein are polarizing reflective screens for use in immersive display systems, the screens of an immersive display system being configured to reduce or minimize the effects of cross-talk on projected images.

The systems and methods provided herein are configured to improve contrast ratio and/or dynamic range for immersive display systems having a plurality of projection surfaces with a plurality of projector systems. There may be a number of systems and methods for improving contrast ratio and/or dynamic range that may be combined with the disclosed systems and methods to achieve one or more specific advantages. In some implementations, these systems and methods may have certain shortcomings that the disclosed systems and methods overcome, either on their own or in combination with other systems and methods. For example, a method to improve contrast of an immersive dome theater concentrates the brightness of the image within a central field-of-view of viewers that are unidirectionally seated in the theater. However, this may disadvantageously sacrifice brightness toward the outside edges of the viewer's field-of-view. Another method to improve contrast includes coating the screen with a visually-reflective coating that provides a textured surface and that acts as a micro-baffle to suppress cross-reflection of projected imagery. Another method to improve contrast of a curved, back-projection screen or immersive display includes using a specific tailored or optimized rear-screen coating.

The contrast of a front projection screen can be improved through the use of metal flakes and light absorbing particles distributed in a host material. Similarly, a reflection-type projection screen may include a light-reflecting layer and a transparent light-diffusing layer, the light-reflecting layer comprising a transparent resin with flakes of a light-reflective material dispersed therein and the transparent light-diffusing layer comprising a transparent resin with fine crystalline particles of calcite and achromatic dyes or pigments dispersed therein. Such screens can improve luminance and image contrast while substantially maintaining the same angle of diffusion or without substantially decreasing the angle of diffusion.

Contrast for a front-projection screen can be improved by selective reflection of light in the wavelength range of the image display light and by absorbing ambient light. For example, a screen for use in a front-projection system can include a section configured to reflect light of targeted wavelengths or targeted wavelength ranges, where the reflection is greater than non-targeted wavelengths or non-targeted wavelength ranges. Such a screen can enhance contrast between incident projected light and ambient light. As another example, a selective-reflecting projection screen can include a structure configured to selectively reflect incident optical energy of a number of relatively narrow bands of optical wavelength ranges and to absorb light with wavelengths falling between and/or outside the narrow bands. The projection screen can include a micro-lens structure that focuses incoming light so that when the light is reflected from the screen, it passes through a relatively small spot having high diffusion or beam spreading.

Rejection of ambient light can be improved in a projection screen by configuring the screen to have different reflectivities for different angles of incidence and/or polarizations. For example, ambient light rejection can be improved by configuring a screen to have relatively high reflectivity for light with a relatively low angle of incidence and a polarization parallel to that of the projector, relatively low reflectivity for light with a relatively high angle of incidence and a polarization parallel to that of the projector, and relatively low reflectivity for light with a polarization perpendicular to that of the projector (having either a low or high angle of incidence). A reflective front projection screen can be configured to project an image with enhanced contrast and relatively wide viewing angle in the presence of relatively high levels of ambient light by including a reflective polarizing element in combination with a diffusing element and/or a glare-suppression element. A projection screen can comprise a cholesteric liquid crystalline, polarized-light selective reflection layer to selectively and diffusely reflect a targeted or known polarized-light component. A front projection screen may also be overlaid with a polarized sheet.

A high contrast front projection screen can include a plurality of micro-elements that include surfaces configured to change from a low-reflectivity state to a high-reflectivity state by switching on and off appropriate structures arranged on a substrate. The surface of the micro-elements are in a low-reflectivity state for black segments of a projected image or video and are in a high-reflectivity state for segments that are outside of the black segments of the projected image or video.

A front projection screen can include a lenticular lens sheet overlaying a polarization rotation plate, the polarization plate overlaying a reflective surface, and a polarizing film overlaying the lenticular lens sheet. The polarizing film can include non-polarizing segments at the focal point of each lenticular lens so that light from the projector is relatively un-attenuated by the polarizing film while light from other sources is attenuated. Light from the projector is generally distributed with an aspect ratio of viewing angle equal to that of the lenses in the lenticular lens sheet.

A front projection screen can be overlaid with a plastic sheet filled with polymer-dispersed liquid crystals and having a transparent electrode on both sides of the plastic sheet. The plastic sheet is transparent in a first state and can be turned to white by applying a voltage across the plastic sheet. The plastic sheet can be coated black on a one side so that when no voltage is applied to the electrodes, the screen is black due at least in part to reflected light from the back side of the transparent plastic sheet. When voltage is applied to the electrodes, the screen can turn white during the time that the voltage is applied. The screen can receive pulses of voltage that are synchronized with a pulsing of a projector. In such a scenario, the screen can be configured to be white or to have a relatively high reflectivity during the time that the projector is active, and to be black or to have a relatively low reflectivity when the projector is inactive.

Some screens can have a visually-reflective layer applied to an inner surface of an open-cell foam. The reflective coating can be applied sufficiently thin to not fill and/or block the open-cell foam structure. The reflective coating can coat the inside of the open cells. This can yield a projection surface that reflects most light at near-normal incidence angles, and trap in the open cell light from more oblique incident angels, thereby reducing cross-reflections. The resulting screen includes a micro-baffled screen surface with a relatively high degree of directionality and with a relatively rapid angular cut-off. However, this design may be undesirable and/or disadvantageous in an immersive display system where a wide range of viewing angles with the same or almost the same luminance is desired or preferable. This may also be undesirable and/or disadvantageous in an immersive display system where a smooth and gradual decrease in luminance as a function of viewing angle is desired or preferable.

The above systems and methods can be used to enhance the contrast of immersive display systems by reducing cross-reflection, but may suffer from some disadvantages that are overcome by the systems and methods described herein. In particular, some embodiments disclosed herein provide for an immersive display system that suppresses cross-reflection and that has a targeted or desired luminance as a function of viewing angle (e.g., a smooth and gradual decrease in luminance as a function of viewing angle).

Some of the above-described screen designs assume that viewers use the same or similar central field-of-view. This may be disadvantageous because it restricts the use of the immersive display system. Some of the above-described issues may be addressed by the systems and methods disclosed herein. In particular, an immersive display system is described that suppresses cross-reflection while providing a substantial improvement to contrast where viewing directions are allowed to expand beyond a common central field-of-view. Such an immersive display system can be used in more situations and configurations because it provides an improved viewing experience for a larger audience.

Some of the above-described systems and methods configured to enhance contrast for front-projection systems are aimed at rejecting ambient light for use with individual front projectors. Such systems and methods may not be effective for suppressing cross-reflection and improving contrast for ensembles of projectors configured to project images on multiple front and/or rear projection screens. In such immersive display systems with multiple projectors and/or screens, the relative screen orientations and optical screen characteristics may produce cross-reflections which reduce contrast and/or color saturation of projected images. Accordingly, one or more of the embodiments disclosed herein include an immersive display system that effectively suppresses cross-reflection.

Immersive Display System

Figure 1B:
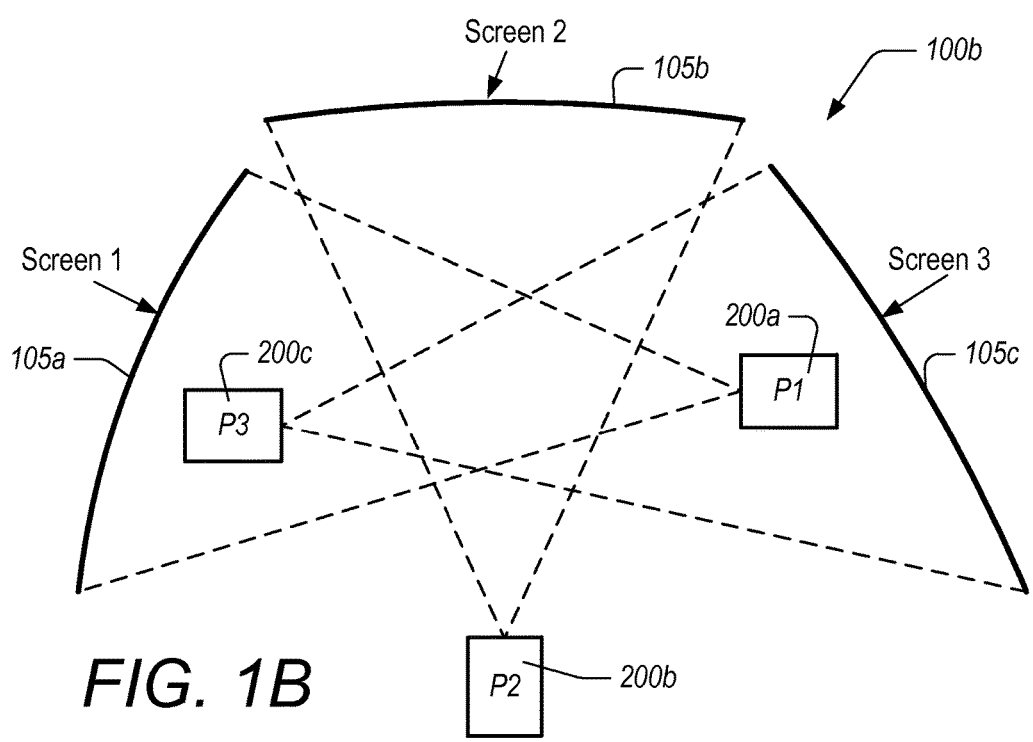
Figure 10:
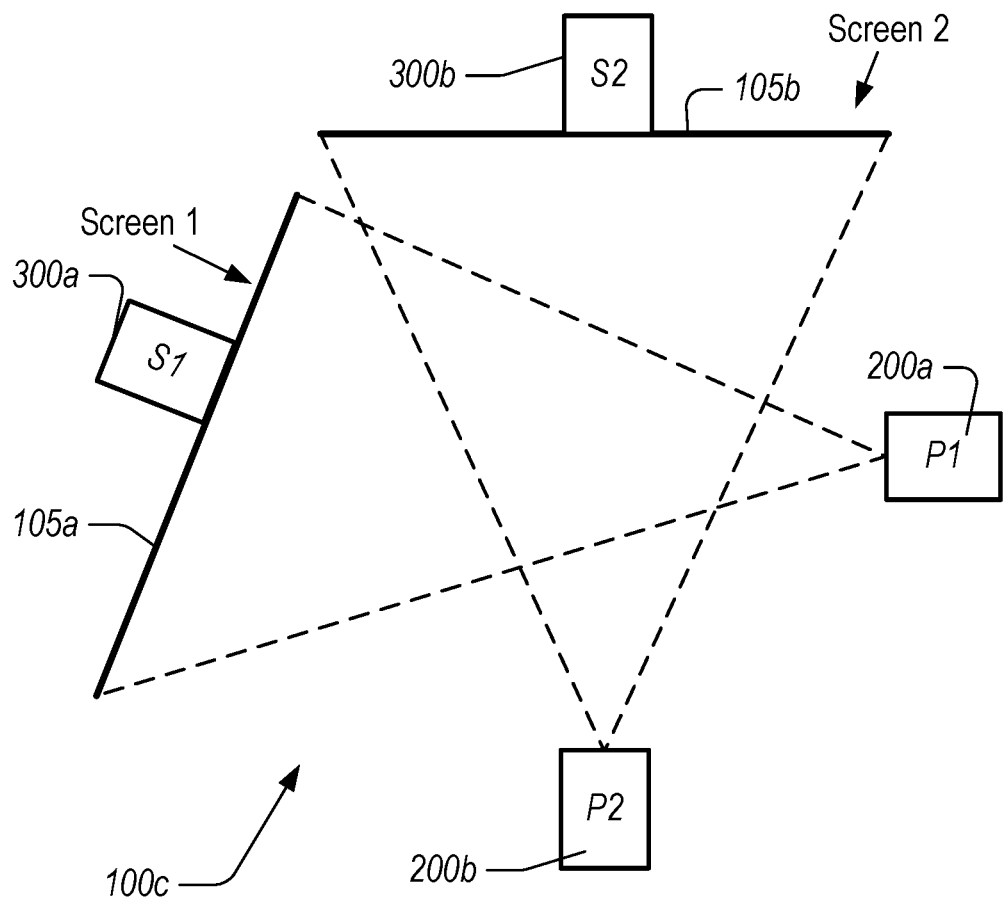
FIG. 10 illustrates an example immersive display systems comprising two screens for providing an immersive display experience.

FIGS. 1A, 1B and 10 illustrate example immersive display systems 100a, 100b, 100c comprising a plurality of projectors 200a, 200b, or 200c configured to project images onto corresponding screens 105a, 105b, or 105c for providing an immersive display experience. The screens 105a-105c can be planar front-projection displays, as illustrated in FIGS. 1A and 10, or curved front-projection displays, as illustrated in FIG. 1B. There can be gaps between adjacent displays. For example, screens 105a-c can have gaps between them as depicted in FIGS. 1A, 1B, and 10. In some embodiments, the gaps can be relatively small, close to zero, or zero. The immersive display systems 100a, 100b, 100c can include a plurality of flat or curved displays or screens or it can include a single curved display or screen. The screens can be rotated relative to one another. The screens 105a-c can also have respective inclinations relative to one another. The screens 105a-c of the immersive display systems 100a, 100b can include flat screens, curved screens, or a combination of both.

The example immersive display systems 100a, 100b includes three front-projection screens 105a-c wherein the image on each screen is provided by a projector system. Projector system 200a is configured to project video onto screen 105a, projector system 200b is configured to project video onto screen 105b, and projector system 200c is configured to project video onto screen 105c. Sound systems may be mounted behind screen 105a, screen 105b and/or screen 105c.

In some embodiments, the example immersive display system 100c includes two front-projection screens 105a, 105b wherein the image on each screen is provided by a projector system. Projector system 200a is configured to project video onto screen 105a and projector system 200b is configured to project video onto screen 105b. For example, the immersive display system 100c may include a first screen 105a having a multilayer structure configured to selectively reflect light in a first polarization state, and a second screen 105b comprising a multilayer structure configured to selectively reflect light in a second polarization state orthogonal to the first polarization state. The immersive display system 100c may also include a first projector system 200a configured to project a first video onto the first screen 105a with light in the first polarization state, and a second projector system 200b configured to project a second video onto the second screen 105b with light in the second polarization state. The first screen 105a may be positioned adjacent to the second screen 105b so that the first video and the second video are configured to be simultaneously viewed by a plurality of viewers in an immersive viewing environment. Sound systems 300a, 300b may be mounted behind screen 105a and/or screen 105b, for example as shown in FIG. 10.

In some embodiments, the screens 105a-c can be curved screens, an example of which is illustrated in FIG. 1B. The considered curvature can be in the plane of the paper, in a plane perpendicular to the plane of the paper, or in both the plane of the paper and in a plane perpendicular to the paper. This immersive display system 100b, for example, comprises three curved front projection screens 105a-c, and the image on each screen is projected from one or more projectors. For example, projector system P1 200a can be one or more projectors projecting the image on screen 1 105a, projector system P2 200b can be one or more projectors projecting the image on screen 2 105b, and projector system P3 200c can be one or more projectors projecting the image on screen 3 105c.

Light emerging from the projector systems 200a-c can each have different spectra. This may result in color differences between the images provided by these projector systems. These color differences can be electronically compensated. An example method for compensating color differences between two projectors is disclosed in U.S. Pat. Pub. No. 2007/0127121 to B. Maximus et al., which is incorporated by reference herein in its entirety. The spectra of the projector systems 200a-c can be configured to project, after electronic compensation, color images with a color gamut according to Rec. 709 or DCI P3, for example.

The projector systems 200a-c refer to devices configured to project video on the screens 150a-c. These projector systems 200a-c can include a media server and a projector. In some embodiments, the media server is physically separate from the projector and is communicably coupled (e.g., through wired or wireless connections) to the projector. In some embodiments, the projector system comprises an integrated media server and projector. The media server portion of the projector system can include hardware and software components configured to receive, store, and decode media content. The media server can include hardware and software configured to ingest and decode digital content files, to produce a media stream (e.g., video and audio), to send image data to the projector. The media server can include modules for ingesting digital content, decoding ingested content, generating video from the decoded content, generating audio from the decoded content, providing security credentials to access secure content, and to generate or interpret synchronization signals to provide a synchronized presentation, and the like. The projector can include an optical engine, a modulation element, optics, and the like to enable the projector to produce, modulate, and project an image. For example, the projector may be implemented using a cathode ray tube (CRT), a liquid crystal display (LCD), digital light processing (DLP), digital micro-mirror devices (DMD), etc.

The projector systems 200a-c can be configured to provide video with an aspect ratio and resolution conforming to any of a number of standards including, for example and without limitation, 4K (e.g., 3636×2664, 3996×2160, 3840× 2160, 4096×2160, etc.), 2K (e.g., 1828×1332, 1998×1080), HD (e.g., 1920×1080, 1280×720), or the like. The projector systems 200a-c can be configured to provide video with a variety of frame rates including, for example and without limitation, 24 fps, 30 fps, 60 fps, 120 fps, etc. The projector systems 200a-c can be configured to display synchronized 3D content (e.g., stereoscopic video) on two or more screens.

As an example, the immersive display systems 100a, 100b can include DCI-compliant projector systems 200a-c configured to play DCI-compliant content inside a movie theater. The DCI-compliant content can include a media stream (e.g., video data or video and audio data extracted from digital content). In some implementations, the media stream is provided as a digital cinema package ("DCP") comprising compressed, encrypted, and packaged data for distribution to movie theaters, for example. The data can include a digital cinema distribution master ("DCDM") comprising the image structure, audio structure, subtitle structure, and the like mapped to data file formats. The data can include picture essence files and audio essence files that make up the audiovisual presentation in the DCP. The DCP can include a composition which includes all of the essence and metadata required for a single digital presentation of a feature, trailer, advertisement, logo, or the like. The projector systems 200a-c can be configured to ingest the DCP and generate a visually indistinguishable copy of the DCDM and then use that copy of the DCDM to generate image and sound for presentation to an audience.

FIGS. 1A and 1B illustrate 3 projector systems 200a-c and 3 screens 105a-c. However, the immersive display system can include a different number of projector systems and/or screens. For example, the immersive display systems 100a, 100b can include 2, 3, 4, 5, 6, 7, 8, 9, 10, or more than 10 projector systems. The immersive display systems 100a, 100b can include 2, 3, 4, 5, 6, 7, 8, 9, 10, or more than 10 screens. The immersive display systems 100a, 100b can be configured such that more than one projector system provides video on a single screen, such that the images substantially overlap. The immersive display systems 100a, 100b can be configured such that projector systems provide video on a single screen wherein the videos from projector systems minimally overlap, are adjacent to one another, or are near one another to provide a substantially unitary video presentation.

The sound in an immersive display system can be important, and may be of comparable importance to the visual information. Typical immersive display systems may experience problems with audio or acoustics based at least in part on the viewing surface acting as an acoustic reflector. This can result in undesirable and/or unwanted echoes and reverberations of sounds within the immersive environment. In some implementations, the immersive display systems 100a, 100b include perforated display screens 105a, 105b, and/or 105c to reduce this problem. Perforated display screens can be configured to allow sound within the immersive environment to escape the environment and to allow sound from speakers behind the screens to enter the immersive environment. This can reduce or eliminate unwanted or undesirable echoes and reverberations while increasing the desired sound within the immersive environment.

Figure 11:
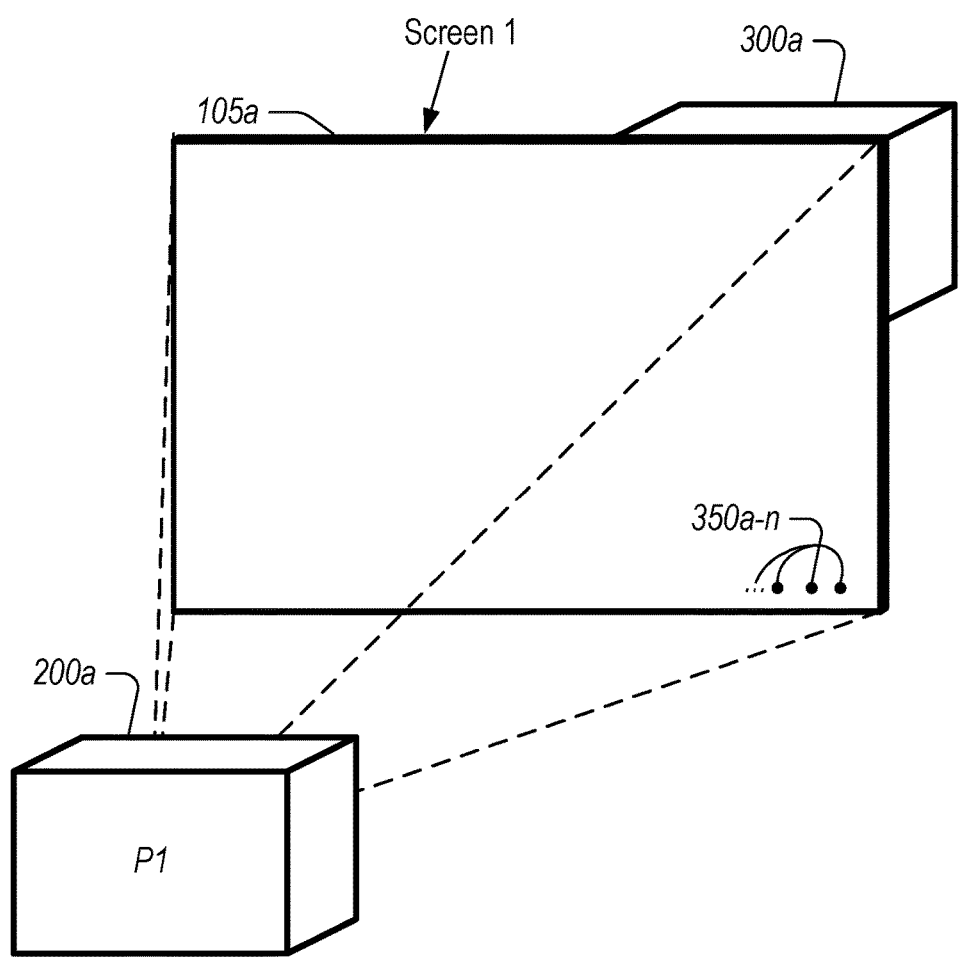
FIG. 11 illustrates a perspective view of an example screen that has a sound system and an array of perforations.

As shown in FIG. 10, sound systems (e.g., sound systems 300a, 300b) may be mounted behind the front projection screen 1 105a, screen 2 105b and/or screen 3 105c. To reduce attenuation of high frequency sound waves, arrays of perforations (e.g. circular holes) may be used. The perforation in a screen may be laid out so that the centers of the holes are equidistant in, for example and without limitation, a staggered or straight hole arrangement. The number of equidistant circular holes per unit area, the hole diameter, and/or the screen thickness are parameters that can be tuned to achieve acceptable or suitable transmission loss at frequencies larger than about 1 kHz. For example, FIG. 11 shows a perspective view of an example screen (e.g., screen 105a) that that has a sound system 300a mounted behind first screen 105a, and the first screen 105a comprises a plurality of holes 350a-n configured to allow sound from the sound system 300a to reach the immersive viewing environment.

Example Immersive Display System Screens

Figure 2A:
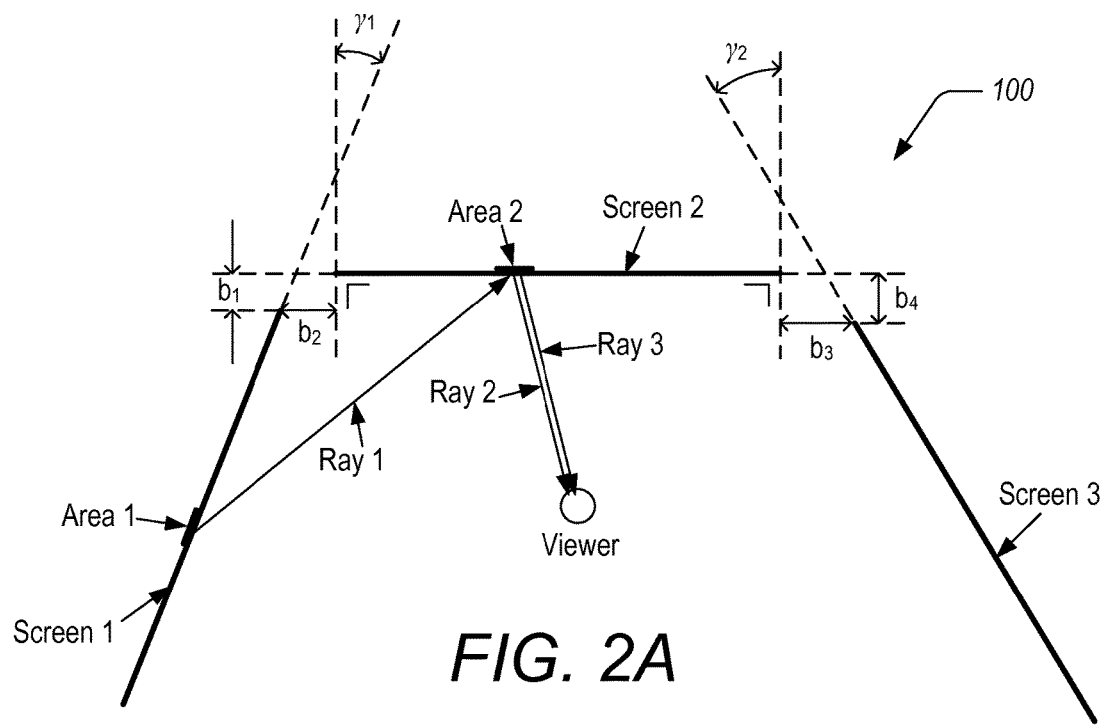
FIGS. 2A and 2B illustrate examples of immersive display systems comprising three screens, and illustrate examples of cross-talk in such immersive display systems.
Figure 2B:
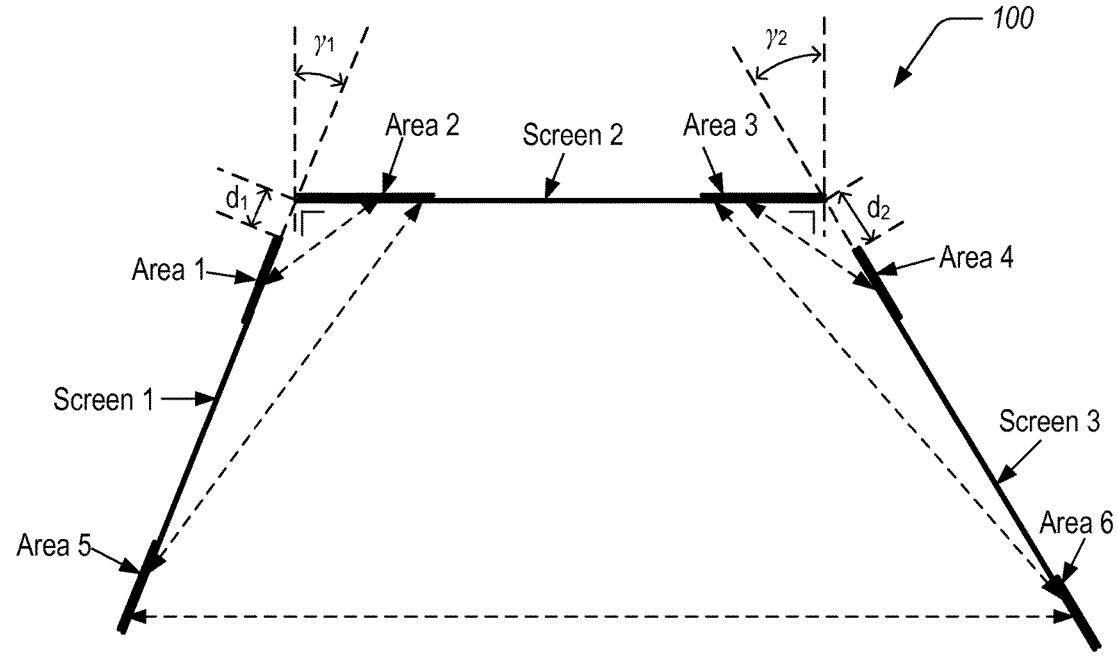

FIGS. 2A and 2B illustrate examples of immersive display systems 100 comprising three screens, and illustrate examples of cross-talk in such immersive display systems. An immersive display system 100 can include a plurality of screens. The screens can be arranged such that there are gaps between adjacent displays. For example, the immersive display system 100 illustrated in FIG. 2A can have gaps $b_1$, $b_2$, $b_3$, and $b_4$, and the immersive display system 100 illustrated in FIG. 2B can have gaps $d_1$ and $d_2$. In some embodiments, the gaps can be relatively small, close to zero, or zero. The screens can have a relative orientation characterized, for example, by angles $\gamma_1$ and $\gamma_2$. Screens 1, 2 and 3 can also have respective inclinations corresponding to angles $\gamma_3$, $\gamma_4$, and $\gamma_5$, where the angles are measured with respect to a direction perpendicular to the plane of the paper.

With reference to FIG. 2A, Ray 1 represents reflected light from an image projected onto Screen 1, Ray 1 reflected from Area 1 and incident on Area 2 of Screen 2. Ray 3 represents reflected light from an image projected onto Screen 2 at Area 2 that reaches a viewer. Ray 2 represents reflected light from Ray 1 at Area 2 on Screen 2. In the absence of Ray 1, Ray 3 is reflected by Screen 2 to the viewer, Ray 3 being part of the original image. Where there is cross-talk from Area 1 onto Area 2, however, Ray 2 is also perceived by the viewer. The mixture of Ray 2 and Ray 3 is referred to as cross-talk and can substantially reduce the contrast ratio and the color saturation of the original images, consequently reducing the dynamic range of the original images.

FIG. 2B illustrates another example of cross-talk, where intensity can depend on a distance between areas that are mutually illuminated. For example, the immersive display system 100 includes multiple adjacent or almost adjacent screens, the cross-talk may be pronounced on the parts of the screens that can illuminate each other from a relatively short distance and for screen-configurations where the angle between the screens is relatively small. As the distance between the considered screen areas increases, the illuminance caused by the cross-talk decreases (e.g., approximated by an inverse square law), and when the angle between the screens increases the illuminance also decreases (e.g., approximated by the cosine law of illumination). For example, for the immersive display system 100, the cross-talk between Area 1 and Area 2 or between Area 3 and Area 4 will be more intense than between Area 2 and Area 5, between Area 3 and Area 6, or between Area 5 and Area 6.

To illustrate the effect of cross-talk on contrast ratio, a simple example will be provided. Contrast ratio is related to the quality of a display system. The full-on/full-off contrast ratio (e.g., sequential contrast ratio) can be defined as a ratio of maximum luminance to minimum luminance. Maximum luminance, $L_{max}$, can be a luminance value output by a display that is driven with a 100% white signal, and minimum luminance, $L_{min}$, can be a luminance value output by a display that is driven with a 0% white level (e.g., a black level).

$$C_{on\,off} = \frac{L_{max}}{L_{min}}$$

The measured luminance in general depends on the observation angle and the contrast ratio is generally a function of the observation angle. Where there is peripheral illumination incident on the screen of the display, it may be partially reflected towards the viewer and added to the luminance from the display. With a non-zero peripheral illumination, the full-on/full-off contrast ratio is:

$$C_{on\,off} = \frac{L_{max} + L_a}{L_{min} + L_a}$$

where $L_a$ corresponds to the peripheral illumination and the reflection characteristics of the display screen.

Another method to characterize the contrast ratio of a display is sometimes referred to as the 'checkerboard method,' and is prescribed in ANSI 1992, IEC 2002. In this method, a 4×4 checkerboard pattern of black and white rectangles that covers the complete image area of the display is used. The luminance at the center of each rectangle is measured. The eight white values are averaged, $\langle L_{cb,max} \rangle$, and the eight black values are averaged, $\langle L_{cb,min} \rangle$. The contrast, sometimes referred to as ANSI contrast ratio, is then:

$$C_{ANSI} = \frac{\langle L_{cb,max} \rangle}{\langle L_{cb,min} \rangle}$$

The ANSI contrast ratio can generally depend on the observation angle; and, if the peripheral illumination is non-zero, that non-zero illumination may also influence the measured ANSI contrast ratio:

$$C_{ANSI} = \frac{\langle L_{cb,max} \rangle + L_a}{\langle L_{cb,min} \rangle + L_a}$$

Values for projection displays are provided to give some example values for contrast ratios (e.g., $C_{onoff}$ and $C_{ANSI}$). As demonstrated by these values, the contrast ratio can greatly reduce where there is peripheral illumination. A first example projection display has a maximum luminance, measured in a direction orthogonal to the screen, of 500 cd/m² and a minimum luminance of 0.25 cd/m², giving a full-on/full-off contrast ratio of 2000:1 when the peripheral light is zero. If, instead, there is incident peripheral light that is reflected to the observer and that reflected peripheral light adds 5 cd/m², then the full-on/full-off contrast ratio is reduced to ~96:1. For a typical projection display, the ANSI contrast ratio is lower than the full-on/full-off contrast ratio and can be, for example, ~200:1. For the same reflection of the peripheral light described in this paragraph, the ANSI contrast ratio is reduced to ~67:1.

Example Polarizing Reflective Screens

With reference to FIGS. 1A and 1B, light from projector system P2 200b can be configured to have a first polarization state, and light from projector systems P1 200a and P3 200c can be configured to have a second polarization state orthogonal to the first polarization state. Screen 2 105b can be configured to have a relatively high reflectivity for the first polarization state and a relatively low reflectivity for the second polarization state. Screen 1 105a and screen 3 105c can be configured to have a relatively high reflectivity for the second polarization state and a relatively low reflectivity for the first polarization state. As used herein, a screen having a relatively low reflectivity substantially absorbs incident light. Each of the projector systems 200a-c can be configured so that a projector does not obstruct light provided by another projector.

Figure 3A:
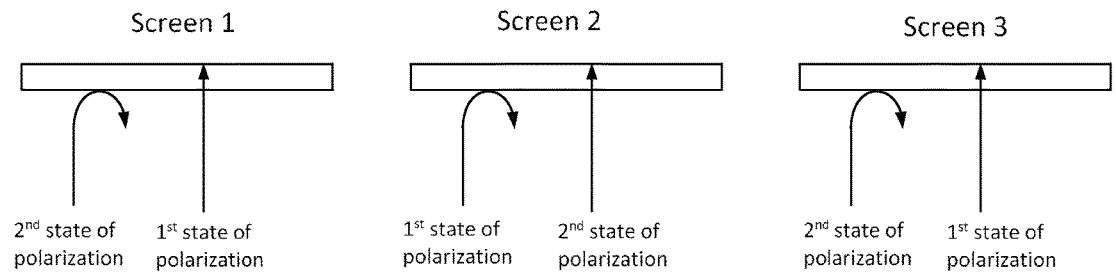
FIGS. 3A-3D illustrate conceptually various example configurations of reflection properties of screens in an immersive display system.
Figure 3B:
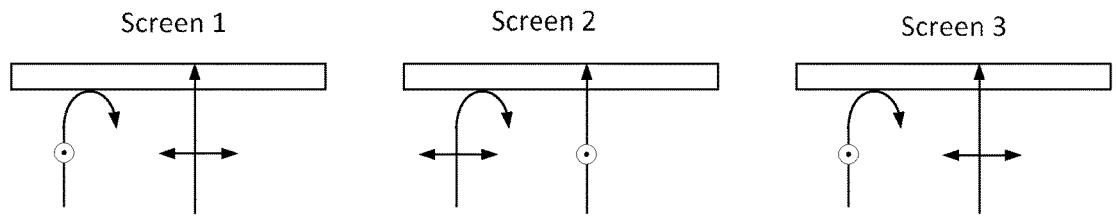
Figure 3C:
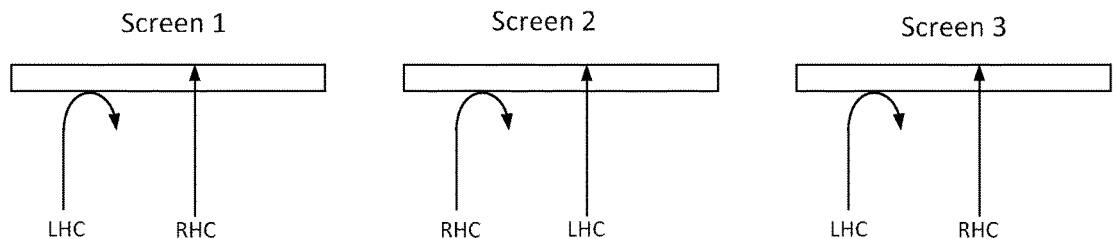
Figure 3D:
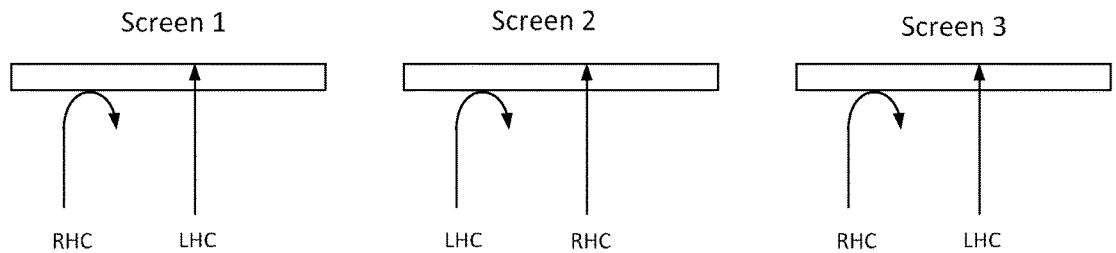

FIGS. 3A-3D illustrate conceptually various example configurations of reflection properties of screens 1-3. As illustrated, screens 1 and 3 can be configured to have similar reflection properties (e.g., configured to respectively reflect and absorb light with the same polarization) whereas screen 2 can be configured to reflect light that has an orthogonal polarization to light that is reflected by screens 1 and 3 and to absorb light that has an orthogonal polarization to light that is absorbed by screens 1 and 3. Said in a different way, screen 2 can be configured to reflect light that has the same polarization as light that is absorbed by screens 1 and 3 and to absorb light that has the same polarization as light that is reflected by screens 1 and 3. Examples of orthogonal combinations of first and second polarization states suitable for the immersive display systems include linear polarizations and right- and left-handed circular polarizations. For example, FIG. 3B illustrates reflection properties of screen 1, screen 2, and screen 3 for the case where the first polarization state is linear polarized light and the second polarization state is linear polarized light that is orthogonal to the first polarization state. The two linear polarization directions are not necessarily perpendicular and parallel with the plane of the paper and can have an angle relative to an incident plane wherein the polarization directions are mutually orthogonal. As another example, FIG. 3C illustrates reflection properties of screen 1, screen 2, and screen 3 for the case where the first polarization state is right-handed circular polarized light (RHC) and the second polarization state is left-handed circular polarized light (LHC). As another example, FIG. 3D illustrates reflection properties of screen 1, screen 2, and screen 3 for the case where the first polarization state is left-handed circular polarized light (LHC) and the second polarization state is right-handed circular polarized light (RHC).

As a generalized example, with reference to FIGS. 1A and 3A, light from projector system P2 200b projecting onto screen 2 105b has a first polarization state, and screen 2 105b diffusely reflects the incident light toward viewers because screen 2 105b has a relatively high reflectivity for light in the first polarization state. Screen 2 105b also reflects some of this light in directions towards screen 1 105a and screen 3 105b. Screen 1 105a and screen 3 105c have a relatively low reflectivity for light of the first polarization state so that light reflected from screen 2 105b can be substantially absorbed by screen 1 105a and screen 3 105c and not reflected towards the viewers. Similarly, light from projector systems P1 200a and P3 200b has a second polarization state orthogonal to the first polarization state and screen 1 105a and screen 3 105c diffusely reflect incident light towards the viewers because screen 1 105a and screen 3 105c have a relatively high reflectivity for light in the second polarization state. The contrast of images on screen 1 105a and screen 3 105c is not substantially or significantly reduced by light reflected from screen 2 105b because this light, which is in the first polarization state, is substantially absorbed by screen 1 105a and screen 3 105c rather than being reflected towards the viewers. The contrast of images on screen 2 105b is not substantially or significantly reduced by light reflected from screen 1 105a and/or screen 3 105c because this light, which is in the second polarization state, is substantially absorbed by screen 2 105b rather than being reflected towards the viewers.

Light reflected by screen 1 105a that hits screen 3 105c will be reflected diffusely by screen 3 105c towards the viewers because screen 3 105c has a relatively high reflectivity for light in the second polarization state. However, because the distance between screen 1 105a and 3 105c is relatively large, the illuminance on screen 3 105c caused by the light reflected by screen 1 105a will be low, due at least in part to the reduction in intensity described by an inverse square law for the intensity of light propagating as a function of distance from a source. Consequently, light reflected by screen 1 105a that hits screen 3 105c does not substantially or significantly reduce contrast of images on screen 3 105c.

Similarly, light reflected by screen 3 105c that hits screen 1 105a will be reflected diffusely by screen 1 105a towards the viewers because screen 1 105a has a relatively high reflectivity for light in the second polarization state. However, because the distance between screen 1 105a and 3 105c is relatively large, the illuminance on screen 1 105a caused by the light reflected by screen 3 105c will be low, due at least in part to the reduction in intensity described by an inverse square law for the intensity of light propagating as a function of distance from a source. Consequently, light reflected by screen 3 105c that hits screen 1 105a does not substantially or significantly reduce contrast of images on screen 1 105a.

Example Structures of Polarizing Screens

Figure 4:
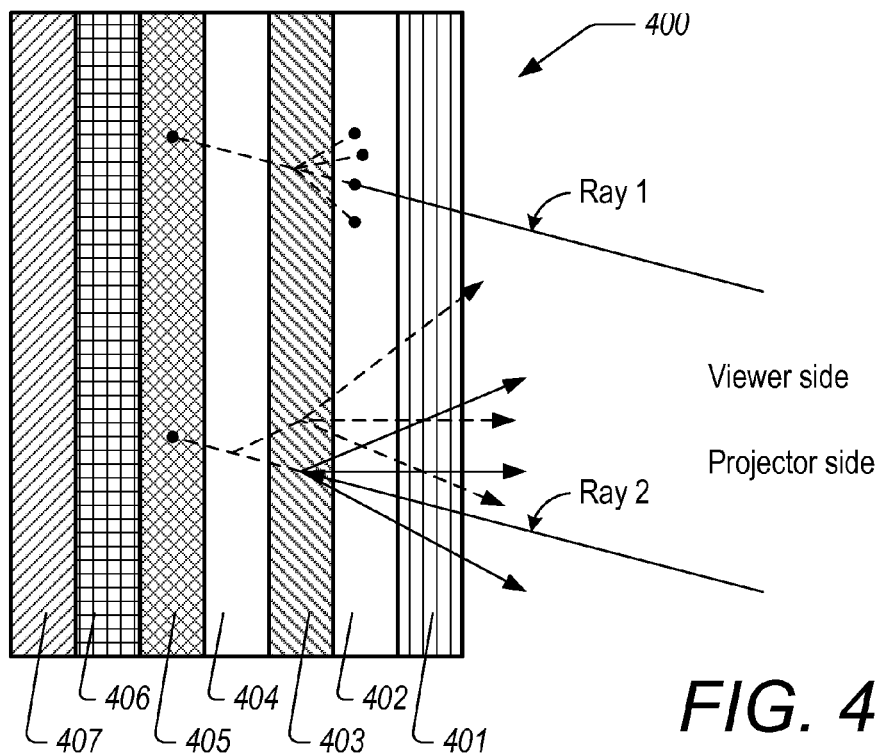
FIG. 4 illustrates a cross-sectional view of an example screen that has a multi-layer structure tailored to reflect light in a first polarization state.

FIG. 4 illustrates a cross-sectional view of an example screen 400 (e.g., screen 1 and screen 3) that has a multi-layer structure. The screens 400 can comprise an anti-reflection element 401 or a glare suppression element to suppress specular reflections of light incident upon the screen 400; a transmitting polarizing element 402 for transmitting the second polarization state and absorbing the first polarization state; a polarization-preserving, light-diffusing element 403 to distribute the light rays into desired or targeted viewing directions; a reflective polarizing element 404 for reflecting the second polarization state polarization and transmitting the remaining portion of the light of the first polarization state; a light-absorbing element for visible light 405 to absorb the remaining light transmitted by the reflective polarizing element; a substrate 406; and an optional adhesive layer 407.

FIG. 4 also illustrates functionality of the polarizing screen 400 where ray 1 represents light in the first polarization state, and ray 2 represents light in the second polarization state. A relatively large portion of the light in the first polarization state is absorbed by the transmitting polarizer element 402. Some remaining light of ray 1 is transmitted by the transmitting polarizing element 402 because the extinction ratio of the transmitting polarizing element 402 is generally less than 100%. The remaining light is scattered by the light diffusing element 403 but can again be absorbed by the transmitting polarizing element 402. If any remaining light of ray 1 is still propagating in the direction of ray 1 it can be transmitted by the reflecting polarizing element 404 and finally absorbed by the light absorbing element 405. Ray 2 representing light in the second polarization state will be mainly transmitted by the transmitting polarizing element 402 and scattered by the light diffusing element 403. The remaining light propagating in the direction of ray 2 is reflected by the reflective polarizing element 404 and again scattered by the light diffusing element 403 when it propagates through the light diffusing layer 403. If any light of ray 2 reaches the light absorbing element 405, it is absorbed by this layer. The anti-reflection element or glare suppression element 401 is configured to suppress specular reflections of both the light of ray 1 and the light of ray 2.

Figure 5:
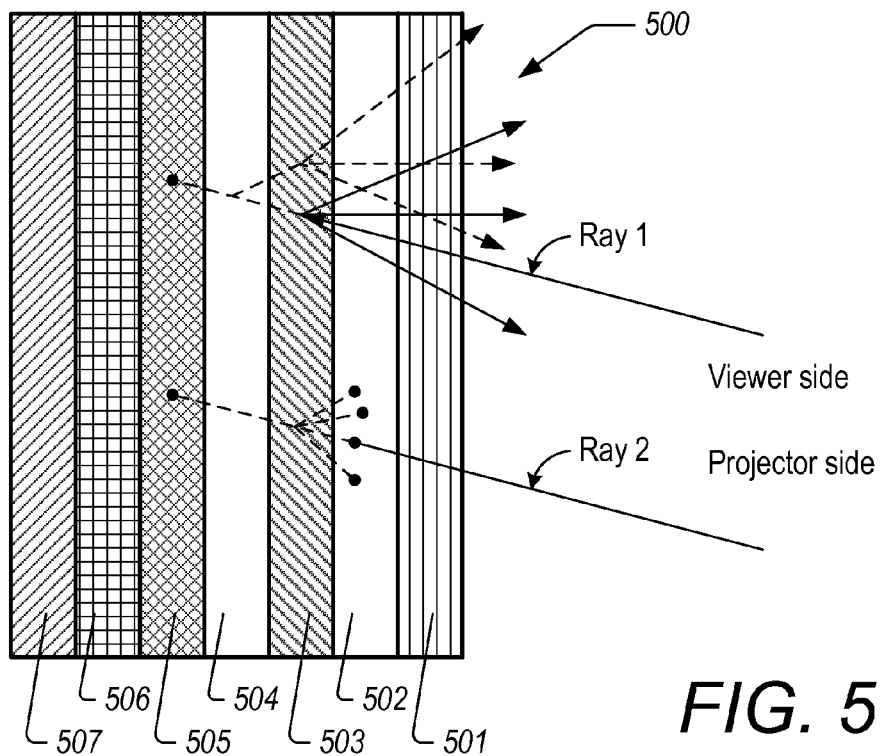
FIG. 5 illustrates a cross-sectional view of another example screen that has a multi-layer structure tailored to reflect light in a second polarization state.

FIG. 5 illustrates a cross-sectional view of an example screen 500, configured to be used with the example screen 400 described herein with reference to FIG. 4. Screen 500 can have a multi-layer structure that includes an anti-reflection element 501 or a glare-suppression element to suppress specular reflections of light incident upon the screen; a transmitting polarizing element 502 for transmitting light in the first polarization state and absorbing light in the second polarization state; a polarization preserving light diffusing element 503 to distribute the light rays into desired or targeted viewing directions; a reflective polarizing element 504 for reflecting light in the first polarization state and transmitting the remaining portion of the light in the second polarization state; a light absorbing element for visible light 505 to absorb the light transmitted by the reflective polarizing element; a substrate 506; and an optional adhesive layer 507.

The functionality of polarizing reflective screen 500 is similar as for screen 400 described herein with reference to FIG. 4. In the case of screen 500, however, light in the first polarization state (Ray 1) is substantially reflected, and light in the second polarization state (Ray 2) is substantially absorbed.

For example, in the case of linear polarized light, the transmitting polarizing element for transmitting the second polarization state (first polarization state) and absorbing the first polarization state (second polarization state) can be realized with sheet polarizers comprising a sheet of polyvinyl alcohol that has been unidirectionally stretched and doped with iodine in a polymeric form. These polarizers have an extinction ratio of up to about 1000:1 in the wavelength range from about 400 nm to about 700 nm. In the case of circular polarized light these linear absorptive polarizers can be combined with a quarter wave plate to transform the circular polarized light to linear polarized light. An example of a polarization-preserving, light-diffusing element is disclosed in U.S. Pat. No. 6,381,068, which is incorporated by reference herein in its entirety.

For example, for the reflective polarizing element for reflecting the second polarization state (first polarization state) and transmitting the remaining portion of the light of the first polarization state (second polarization state), a birefringent multilayer reflective polarizer (BMRP) can be applied.

Example Immersive Display System Using Circulary Polarized Light

An immersive display system can comprise three planar front-projection screens, wherein the images on each screen are projected from one or more projector systems, such as the immersive display system 100$a$ described herein with reference to FIG. 1A. Light provided by the projector system P1, for example, can have the following properties: the polarization state of this light can be left-handed circularly polarized and the wavelength of this light can be within one of three non-overlapping wavelength ranges centered around the wavelengths $\lambda_{r1}$, $\lambda_{g1}$ and $\lambda_{b1}$ with respective spectral widths $\Delta\lambda_{r1}$, $\Delta\lambda_{g1}$, and $\Delta\lambda_{b1}$. The wavelengths $\lambda_{r1}$, $\lambda_{g1}$, and $\lambda_{b1}$ can be chosen to allow projection of color images with a color gamut according to, for example, Rec. 709 or DCI P3. Examples of the center wavelengths include $\lambda_{r1}$=630 nm, $\lambda_{g1}$=532 nm, and $\lambda_{b1}$=445 nm, with spectral widths $\Delta\lambda_{R1} \leq 5$ nm, $\Delta\lambda_{g1} \leq 5$ nm, $\Delta\lambda_{b1} \leq 5$ nm. Other center wavelengths are possible as well as other spectral widths, the numbers presented herein are intended to merely illustrate one example.

Light provided by the projector system P3 can have the following properties: the polarization state of this light can be left-handed circularly polarized and the wavelength of this light can be within one of three non-overlapping spectral ranges centered around, the wavelengths $\lambda_{r3}$, $\lambda_{g3}$, and $\lambda_{b3}$, with respective spectral widths $\Delta\lambda_{r3}$, $\Delta\lambda_{g3}$, and $\Delta\lambda_{b3}$, moreover the spectra of the projector system P1 and the projector system P3 can be non-overlapping. The wavelengths $\lambda_{r3}$, $\lambda_{g3}$, and $\lambda_{b3}$ can be chosen to allow projection of color images with color gamut according to, for example, Rec. 709 or DCI P3. Examples of the center wavelengths include $\lambda_{r3}$=650 nm, $\lambda_{g3}$=552 nm, and $\lambda_{b3}$=465 nm, with spectral widths $\Delta\lambda_{r3} \leq 5$ nm, $\Delta\lambda_{g3} \leq 5$ nm, $\Delta\lambda_{b3} \leq 5$ nm.

The projector systems P1, P3 can be, for example, projectors with red, green and blue laser light sources. These projectors can be adapted to produce left-handed circularly polarized light.

Light provided by the projector system P2 can have the following properties: the polarization state of this light can be right-handed circularly polarized and the wavelength of this light can have a variety of wavelengths and, in some embodiments, can overlap the spectra of light from projector systems P1 and P3. The spectral content of light from the projector system P2 can be configured to allow the projection of color images with color gamut according to, for example, Rec. 709 or DCI P3. One example of spectral content of the projector system P2 includes $\lambda_{r2}$=650 nm, $\lambda_{g2}$=552 nm, and $\lambda_{b2}$=465 nm, with spectral widths $\Delta\lambda_{r2} \leq 5$ nm, $\Delta\lambda_{g2} \leq 5$ nm, $\Delta\lambda_{b2} \leq 5$ nm.

The projector system P2 can include, for example, projectors with red, green and blue laser light sources. These projectors can be adapted to produce right-handed circularly polarized light.

Due at least in part to differences in the emitted spectra of the projector systems P1 and P3, potentially also with projector system P2, there may be a color difference between the images of these projectors. These color differences can be compensated for electronically. An example method for compensation of color differences between two projectors is described in U.S. Pat. Pub. No. 2007/0127121, which is incorporated by reference herein in its entirety.

Figure 6:
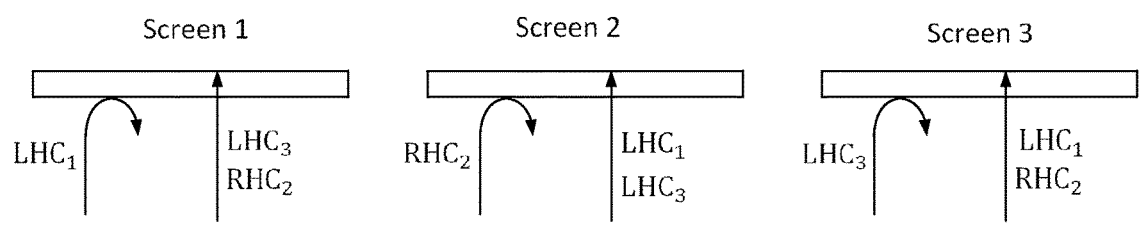
FIG. 6 illustrates a conceptual representation of the reflection properties of three screens, where LHC refers to light in a left-hand circular polarization state, RHC refers to right-hand circular polarization state, and the subscripts refer to the spectral content.

FIG. 6 illustrates a conceptual representation of the reflection properties of screen 1, screen 2, and screen 3, where LHC refers to light in a left-hand circular polarization state, RHC refers to right-hand circular polarization state, and the subscripts refer to the spectral content. Screen 1 can be a reflective wavelength selective screen for left-handed circularly polarized light in the wavelength ranges $\lambda_{or1} \pm 7.5$ nm, $\lambda_{og1} \pm 7.5$ nm, and $\lambda_{ob1} \pm 7.5$ nm. These central wavelengths and bandwidths can be chosen based at least in part on the spectrum emitted by the projector system P1. Left-handed circular polarized light outside these wavelength ranges can be substantially absorbed by one or more layers of screen 1. Right-handed circular polarized light can be absorbed by one or more layers of screen 1 for light having a wavelength within or without the selective wavelength ranges. Examples of central wavelengths include $\lambda_{or1}$=635 nm, $\lambda_{og1}$=537 nm, and $\lambda_{ob1}$=450 nm.

Screen 3 can be a reflective wavelength selective screen for left-handed circularly polarized light in the wavelength ranges $\lambda_{or3} \pm 7.5$ nm, $\lambda_{og3} \pm 7.5$ nm, and $\lambda_{ob3} \pm 7.5$ nm. These central wavelengths and bandwidths can be chosen based at least in part on the spectrum emitted by the projector system P3. Left-handed circular polarized light outside these wavelength ranges can be substantially absorbed by one or more layers of screen 3. Right-handed circular polarized light can be absorbed by one or more layers of screen 3 for light having a wavelength within or without the selective wavelength ranges. Examples of central wavelengths include $\lambda_{or3}$=655 nm, $\lambda_{og3}$=557 nm, and $\lambda_{ob3}$=470 nm.

Screen 2 can be a reflective wavelength selective screen for right-handed circular polarized light in the wavelength ranges $\lambda_{or2}\pm7.5$ nm, $\lambda_{og2}\pm7.5$ nm, and $\lambda_{ob2}\pm7.5$ nm. These central wavelengths and bandwidths can be chosen based at least in part on the spectrum emitted by the projector system P2. Right-handed circular polarized light outside these wavelength ranges can be substantially absorbed by one or more layers of screen 2. Left-handed circular polarized light can be absorbed by one or more layers of screen 3 for light having a wavelength within or without the selective wavelength ranges. Examples of central wavelengths include $\lambda_{or3}$=635 nm, $\lambda_{og3}$=537 nm, and $\lambda_{ob3}$=450 nm.

Such frequency selective reflective polarizing screens can be realized, for example, with multi-layers of cholesteric reflective polarizers.

Cholesteric reflective polarizers reflect circular polarized light with the same handedness as the helical structure of the cholesteric material's molecular helix, if the wavelength of the light is within a certain wavelength range $\Delta\lambda$, and transmit all other light. For symmetrical light incidence and reflection under an angle $\alpha$, the central wavelength $\lambda(\alpha)$ of the selective reflection band can be given by:

$$\lambda(\alpha) = \lambda_0 \cos\left[\arcsin\left(\frac{\sin\alpha}{\bar{n}}\right)\right]$$

where $\lambda_0$ is the central wavelength for normal incidence ($\alpha=0°$) and can be given by:

$$\lambda_0 = p\,\bar{n}$$

with p the pitch of the molecular helix, and $\bar{n}=(n_e+n_o)/2$ the average refractive index of the cholesteric material. The variables $n_e$ and $n_o$ are respectively the extraordinary and ordinary refractive index of the cholesteric material.

The reflection range of the cholesteric reflection layer is thus shifted to the shorter wavelengths when $|\alpha|$ increases, this can be referred to as "blue shift."

The spectral bandwidth for selective reflection can be given by:

$$\Delta\lambda = \frac{\Delta n}{\bar{n}}\lambda_0 = p\Delta n$$

with $\Delta n = n_e - n_o$ the birefringence of the cholesteric material.

Consequently, within the reflection band left-handed circular polarized light is reflected and right-handed circular polarized light is transmitted for a left-handed cholesteric layer. Outside the selective reflection band all polarization states are transmitted.

The central reflection wavelength for normal incidence $\lambda_0$ and the spectral width of the selective reflection band $\Delta\lambda$ can be chosen by selecting the pitch p of the molecular helix and the extraordinary and ordinary refractive index, respectively $n_e$ and $n_o$, of the cholesteric material. Approximately 4 to 8 helical turns can be used to obtain a reflectance of about 100% (reflectance may then be saturated).

In TABLE 1, the central reflection wavelength and the spectral width is calculated for cholesteric materials with an average refractive index of 1.6 and different birefringence and pitch values:

| $\bar{n}$ | $\Delta n$ | p (nm) | $\lambda_0$ (nm) | $\Delta\lambda$ (nm) |
|---|---|---|---|---|
| 1.6 | 0.054 | 281.3 | 450 | 15.2 |
| 1.6 | 0.045 | 335.6 | 537 | 15.1 |
| 1.6 | 0.038 | 396.9 | 635 | 15.1 |
| 1.6 | 0.051 | 293.8 | 470 | 15.0 |
| 1.6 | 0.043 | 348.1 | 557 | 15.0 |
| 1.6 | 0.037 | 409.4 | 655 | 15.1 |

The blue shift phenomenon may affect the maximum incident angle on the screen. For example, a shift of about 470 nm to about 460 nm may be caused by a change of incident angle from about 0° to about 18.9° (0.33 rad).

Figure 7:
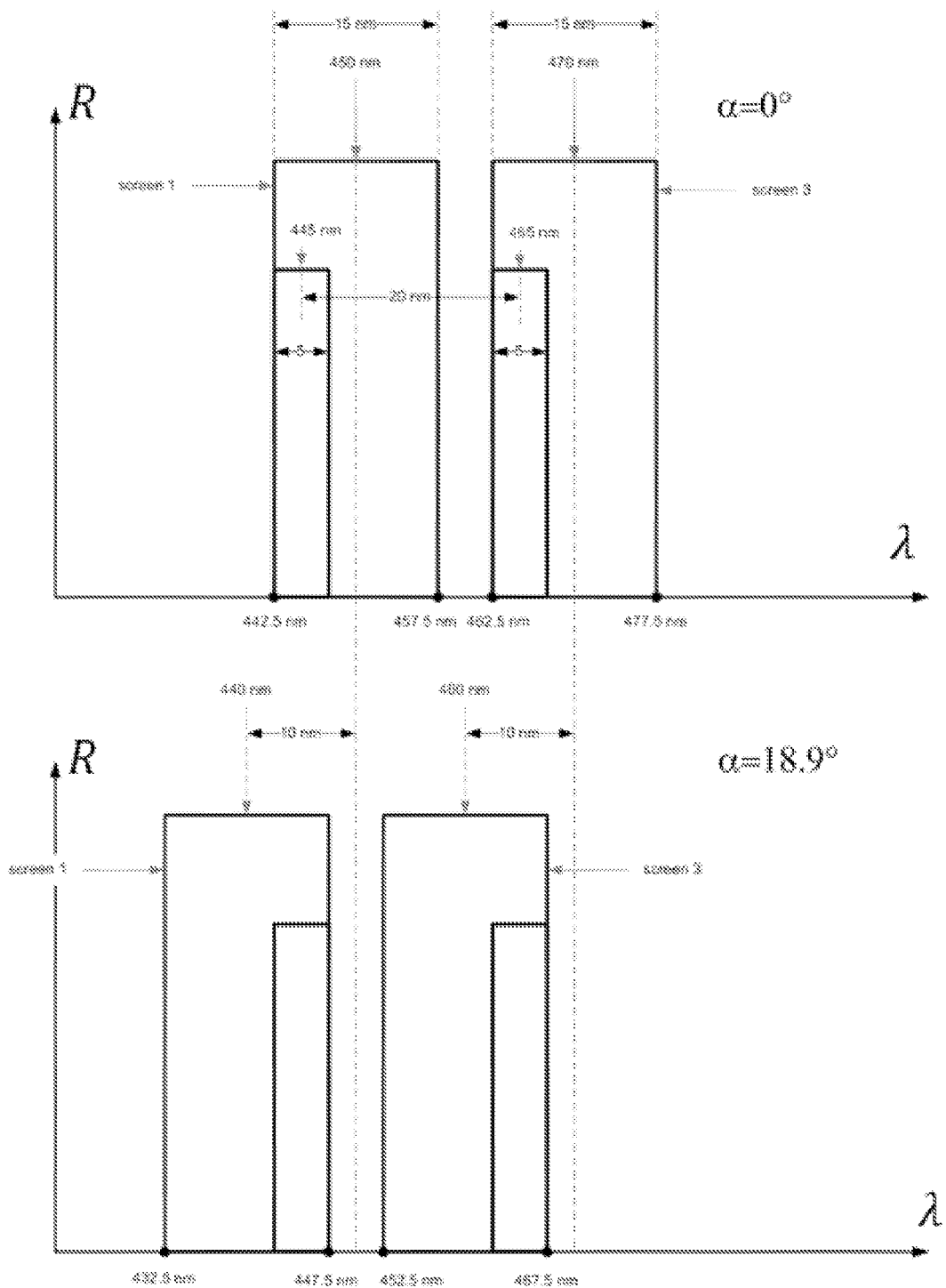
FIG. 7 illustrates a plot of a shift of the reflection spectrum (in the blue channel) for screen 1 and screen 3 caused by a change of incident angle from 0° to approximately 18.9°.
Figure 8:
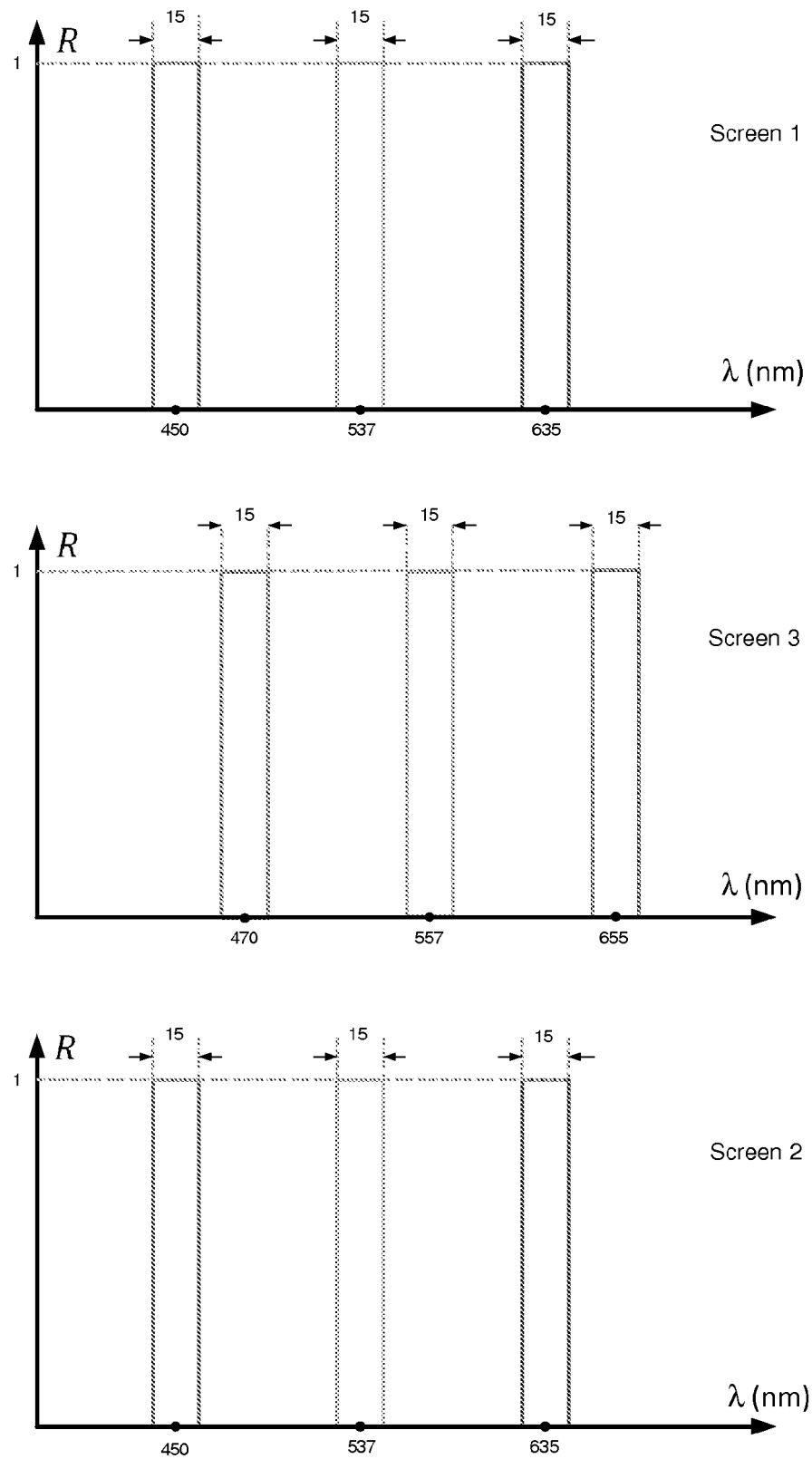
FIG. 8 illustrates a plot of reflectivity as a function of the wavelength for an incident angle of 0° for three screens.

FIG. 7 illustrates a plot of a shift of the reflection spectrum (in the blue channel) for screen 1 and screen 3 caused by a change of incident angle from 0° to approximately 18.9°. The maximum incident angle on the screen depends at least in part on the throw ratio, or the ratio of the projection distance B to the screen width A. FIG. 8 illustrates a plot of reflectivity as a function of the wavelength for an incident angle of 0°, respectively for screen 1, screen 3, and screen 2.

Figure 9:
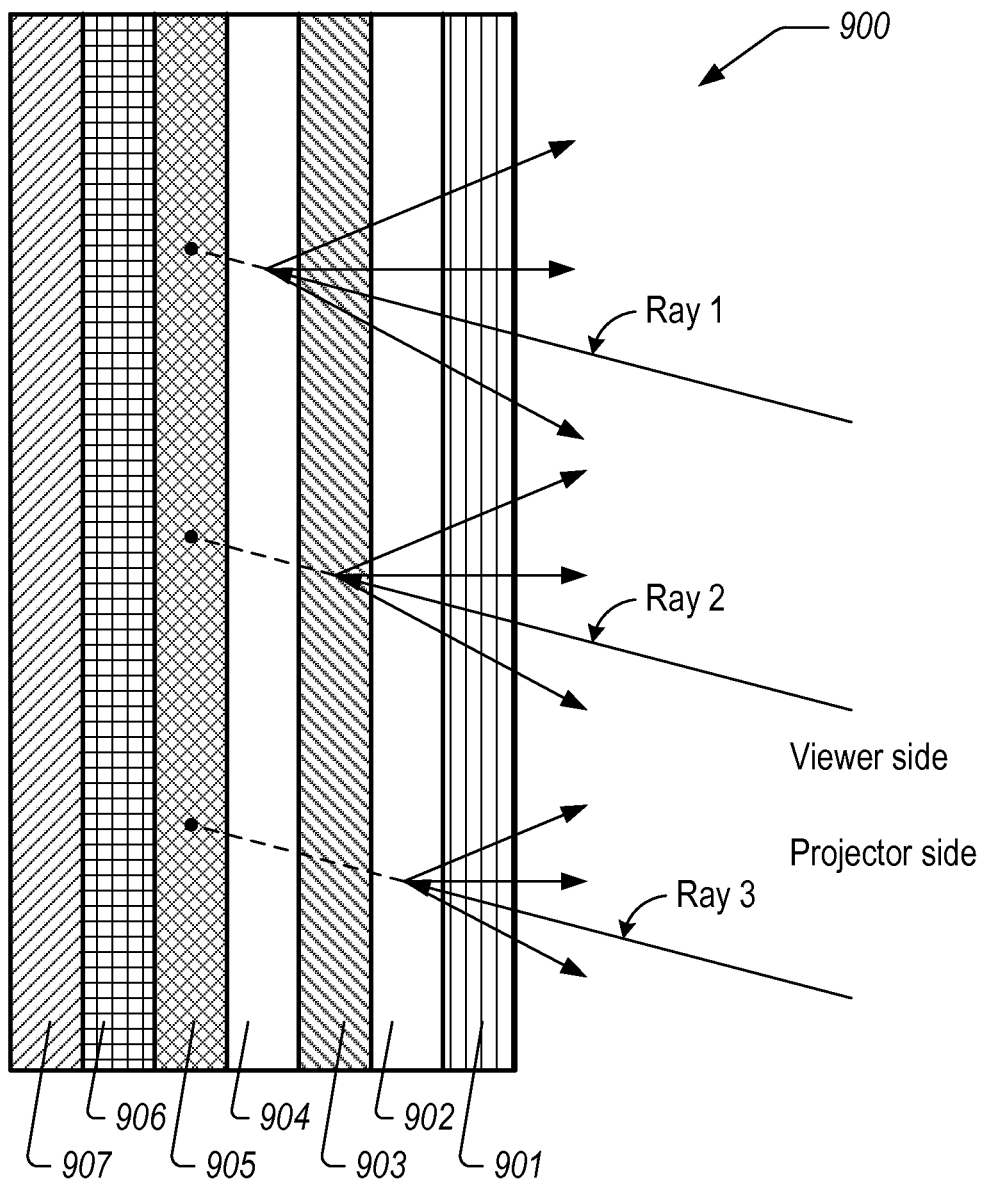
FIG. 9 illustrates a cross-sectional view of an example embodiment of a screen that includes a multilayer structure configured to selectively reflect light within a tailored spectral band and with a tailored polarization state.

FIG. 9 illustrates a cross-sectional view of an example embodiment of a screen 900 that includes a multilayer structure. The screen 900 can include an anti-reflection or glare-suppression element 901 to suppress specular reflections of light incident upon the screen; a cholesteric diffuse-reflecting polarizer 902 for left-handed circular polarized light in the wavelength range $\lambda_{or}\pm7.5$ nm (at normal incidence); a cholesteric diffuse-reflecting polarizer 903 for left-handed circular polarized light in the wavelength range $\lambda_{og}\pm7.5$ nm (at normal incidence); a cholesteric diffuse-reflecting polarizer 904 for left-handed circular polarized light in the wavelength range $\lambda_{ob}\pm7.5$ nm (at normal incidence); a light absorbing element 905; a substrate 906; and optionally an adhesive layer 907. For an adjacent screen, the cholesteric diffuse-reflecting polarizing layers can be switched from left-handed circular polarized light to right-handed circular polarized light. For example, screens 1 and 3 can include cholesteric diffuse-reflecting polarizing layers for left-handed circular polarized light while screen 2 can have cholesteric diffuse-reflecting polarizing layers for right-handed circular polarized light, or vice versa. In addition, the wavelength ranges), $\lambda_{or}$, $\lambda_{og}$, and $\lambda_{ob}$, can be tailored for individual screens in an immersive display system, as described in greater detail herein, so as to substantially reflect incident light from a targeted projector system while substantially absorbing incident light from other screens, other projector systems, and/or ambient light.

FIG. 9 also illustrates the functionality of the wavelength selective diffuse-reflecting front projection screen 900 for circular polarized light. Ray 1 represents RUC (LHC) polarized red light in a wavelength range that is reflected by the cholesteric layer 902. Ray 2 represents RHC (LHC) polarized green light in the wavelength range that is reflected by the cholesteric layer 903. Ray 3 represents RHC (LHC) polarized light in the wavelength range that is reflected by the cholesteric layer 904. The remaining light of the rays 1, 2 or 3 that continues to propagate deeper in the screen 900 can be absorbed by layer 905, the absorbing element for visual light. Layer 901 is an anti-reflection or glare-suppression element, layer 906 is a substrate layer and layer 907 is an optional adhesive layer.

Conclusion

The various features described above may be used independently of one another, or may be combined in various ways. All possible combinations and sub-combinations are intended to fall within the scope of this disclosure. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

While certain example embodiments have been described, these embodiments have been presented by way of example only, and are not intended to limit the scope of the inventions disclosed herein. Thus, nothing in the foregoing description is intended to imply that any particular feature or characteristic is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. An immersive display system comprising:
    a first screen comprising a multilayer structure configured to selectively reflect light in a first polarization state;
    a second screen comprising a multilayer structure configured to selectively reflect light in a second polarization state orthogonal to the first polarization state;
    a first projector system configured to project a first video onto the first screen with light in the first polarization state; and
    a second projector system configured to project a second video onto the second screen with light in the second polarization state,
    wherein the first screen is positioned adjacent to the second screen so that the first video and the second video are configured to be simultaneously viewed by a plurality of viewers in an immersive viewing environment.

2. The immersive display system of claim 1, wherein the first screen is further configured to selectively reflect light in at least three, non-overlapping wavelength bands.

3. The immersive display system of claim 2, wherein the second screen is further configured to selectively reflect light in at least three, non-overlapping wavelength bands, each of the three, non-overlapping wavelength bands also being non-overlapping with the at least three non-overlapping wavelength bands of the first screen.

4. The immersive display system of claim 1, further comprising a sound system positioned behind the first screen.

5. The immersive display system of claim 4, wherein the first screen further comprises a plurality of holes configured to allow sound from the sound system to reach the immersive viewing environment.

6. The immersive display system of claim 1, wherein the first and second screens are curved.

7. A polarizing reflective screen for an immersive display system, the screen comprising:
    a first layer comprising an anti-reflection element or a glare suppression element configured to suppress specular reflections of light incident on the screen;
    a second layer comprising transmitting polarizing element configured to transmit light in a first polarization state and absorb light in a second polarization state orthogonal to the first polarization state;
    a third layer comprising polarizing-preserving, light-diffusing element configured to scatter light in a plurality of directions;
    a fourth layer comprising reflective polarizing element configured to reflect light in the second polarization state and to transmit light in the first polarization state;
    a fifth layer comprising a light-absorbing element for visible light configured to absorb light in the first and second polarization states; and
    a sixth layer comprising a substrate.

8. The screen of claim 7 further comprising an adhesive layer.

9. The screen of claim 7, wherein the first layer is adjacent to the second layer, the second layer is adjacent to the third layer, the third layer is adjacent to the fourth layer, the fourth layer is adjacent to the fifth layer, and the fifth layer is adjacent to the sixth layer.

10. The screen of claim 7, wherein the first polarization state is right-handed circular polarization.

11. The screen of claim 7, wherein the first polarization state is linear polarization.

12. The screen of claim 7, wherein the first polarization state is right-handed circular polarization.

13. An immersive display system comprising:
    the screen of claim 7;
    a second and a third screen positioned on either side of the screen of claim 7, the second and third screens each comprising:
        a first layer comprising an anti-reflection element or a glare suppression element configured to suppress specular reflections of light incident on the screen;
        a second layer comprising transmitting polarizing element configured to transmit light in the second polarization state and absorb light in the first polarization state orthogonal to the first polarization state;

a third layer comprising polarizing-preserving, light-diffusing element configured to scatter light in a plurality of directions;

a fourth layer comprising reflective polarizing element configured to reflect light in the first polarization state and to transmit light in the second polarization state;

a fifth layer comprising a light-absorbing element for visible light configured to absorb light in the first and second polarization states; and a sixth layer comprising a substrate.

14. A polarizing reflective screen for an immersive display system, the screen comprising:

a first layer comprising an anti-reflection or glare-suppression element configured to suppress specular reflections of light incident upon the screen;

a second layer comprising a cholesteric diffuse-reflecting polarizer for left-handed circular polarized light in a first wavelength range;

a third layer comprising a cholesteric diffuse-reflecting polarizer for left-handed circular polarized light in a second wavelength range different from the first wavelength range;

a fourth layer comprising a cholesteric diffuse-reflecting polarizer for left-handed circular polarized light in a third wavelength range different from the first and second wavelength ranges;

a fifth layer comprising a light absorbing element; and a sixth layer comprising a substrate.

15. The screen of claim 14 further comprising an adhesive layer.

16. The screen of claim 14, wherein the first layer is adjacent to the second layer, the second layer is adjacent to the third layer, the third layer is adjacent to the fourth layer, the fourth layer is adjacent to the fifth layer, and the fifth layer is adjacent to the sixth layer.

17. The screen of claim 14, wherein the first wavelength range includes the wavelength 635 nm, the second wavelength range includes the wavelength 537 nm, and the third wavelength range includes the wavelength 450 nm.

18. The screen of claim 14, wherein the first wavelength range includes the wavelength 655 nm, the second wavelength range includes the wavelength 557 nm, and the third wavelength range includes the wavelength 470 nm.

19. The screen of claim 14, wherein each of the first, second, and third wavelength ranges cover about 15 nm.

20. An immersive display system comprising:

the screen of claim 14;

a second screen positioned adjacent to the screen of claim 14, the second screen comprising:

a first layer comprising an anti-reflection or glare-suppression element configured to suppress specular reflections of light incident upon the screen;

a second layer comprising a cholesteric diffuse-reflecting polarizer for right-handed circular polarized light in a fourth wavelength range different from the first, second, and third wavelength ranges;

a third layer comprising a cholesteric diffuse-reflecting polarizer for right-handed circular polarized light in a fifth wavelength range different from the first, second, third, and fourth wavelength ranges;

a fourth layer comprising a cholesteric diffuse-reflecting polarizer for right-handed circular polarized light in a third wavelength range different from the first, second, third, fourth, and fifth wavelength ranges;

a fifth layer comprising a light absorbing element; and a sixth layer comprising a substrate.

* * * * *